Jan. 6, 1953 J. K. DAVIS 2,624,237
LENS TESTING INSTRUMENT
Filed Nov. 4, 1949 2 SHEETS—SHEET 2

INVENTOR.
JOHN K. DAVIS
BY Louis K. Gagnon
ATTORNEY

Patented Jan. 6, 1953

2,624,237

UNITED STATES PATENT OFFICE 2,624,237

LENS TESTING INSTRUMENT

John K. Davis, East Woodstock, Conn., assignor to American Optical Company, Southbridge, Mass., a voluntary association of Massachusetts Application November 4, 1949, Serial No. 125,635

9 Claims. (Cl. 88—56)

This invention relates to the provision of an instrument for testing lenses embodying means for projecting a test image at a given focal plane in combination with means for projecting an image of a surface area of said lens at said focal plane, and method of obtaining said result.

An important object of this invention is to provide a lens testing instrument of the type used for measuring prescriptive characteristics of lenses with means whereby the image of a surface area of the lens being measured will be seen in the eye piece of the instrument as superimposed upon the image of the target used for the lens measuring operation.

Another object is to provide a lens testing instrument with an attachment of the above character whereby a reference mark placed on the surface of a lens, to precisely identify the area of the lens which is contributing the focal power or prismatic effect to be measured, will appear as superimposed upon the image of the target used in the measuring operation when the lens is properly located and the auxiliary lens in the attachment is properly focused on the surface carrying the reference mark.

Another object is to provide a lens testing instrument with an attachment of the above character whereby a specific area of a lens can be measured and said area precisely provided with a reference mark while the lens is retained in the instrument, the image of the target used in the measuring operation being retained during the entire measuring and marking procedures.

Another important object is to provide an attachment of the above character embodying an auxiliary lens having a portion thereof removed, which lens is inserted in front of the telescopic objective of the instrument for causing a portion of the surface of the lens being measured to be imaged in the eye piece of the instrument simultaneously with the image of test means and which, because of its magnification, will render scratches, pits, identification marks, or other similar surface characteristics easily discernible in the image seen in the eye piece.

Another object is to provide an attachment of the above character which can be easily adjusted so that the area of the lens being measured can be brought into focus and imaged in the eye piece to permit visual inspection thereof.

Another object is to provide an attachment for a lens measuring instrument of the above character which is simple in its construction, efficient in its function and comparatively inexpensive to manufacture.

Other objects and advantages of the invention will become apparent from the following description taken in connection with the accompanying drawings, in which.

Figure 1:
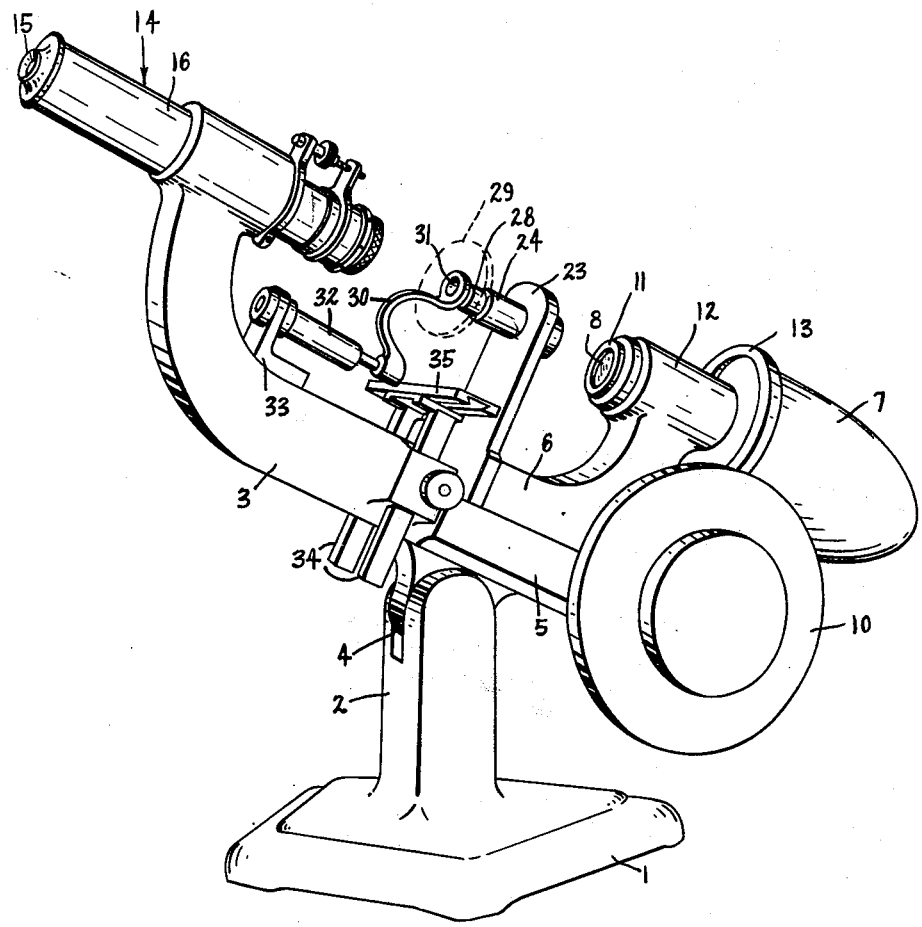
Fig. 1 is a front elevational view of a lens testing instrument embodying the present invention.

Referring to the drawings wherein like characters of reference designate like parts throughout the several views, an embodiment of the invention is illustrated in connection with an instrument having a heavy base 1 which gives the whole instrument stability. A column or standard 2 extends upwardly from the base 1 and has a very rigid substantially arcuately shaped frame 3 pivotally secured to the upper end thereof as at 4. The frame 3 may be swung vertically to a convenient angle relative to the standard 2 in order that the operator may conveniently operate the instrument. The frame 3 has at one end a table 5 on which a carriage 6 is slidably mounted, the carriage 6 carrying a housing 7 having a source of illumination 8 (Fig. 3) therein, with a target 9 being adjustably mounted forward of the illuminating means 8.

The carriage 6 is longitudinally adjustable on the table 5 by conventional means such as a rack and pinion arrangement which may be manually manipulated by means of a knob 10 with suitable scales (not shown) being used to indicate the relative position of the target with respect to other parts of the device as will be described hereinafter. The target 9 is mounted in a tubular retainer 11 which is independently adjustable longitudinally of the optical axis of the instrument in a tubular holder 12 provided therefor on the carriage 6 and is adapted to be rotated about its axis by means of a ring member 13 operatively connected to the tubular retainer 11, the ring member 13 carrying suitable scale means for indicating rotational displacement of the target 9. The detailed structure of such an instrument is shown and its function is described in Troppman Patent No. 1,281,717, issued October 15, 1918, and Tillyer Patent No. 1,542,112, issued June 16, 1925.

The forward end of the frame 3 carries a viewing device 14 adapted to focus the projected image of the target 9 so that it will be visible to the operator through the eye piece 15 and eye piece lenses 15a. The target 9 is preferably formed with spaced parallel lines or cuts and transverse lines or cuts arranged at right angles to the parallel lines or cuts with the central intersection of the lines being made to lie on the optical axis of the instrument so that the image of the intersection will not be displaced relative to said optical axis when the target is rotated with respect to the telescope.

Figure 2:
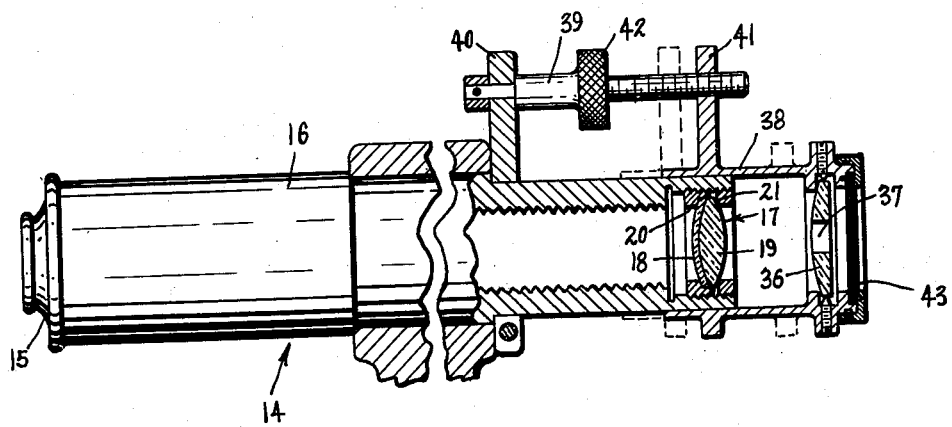
Fig. 2 is a front elevational view partly in section of the image viewing of the telescope portion of the instrument.

The image viewing device or telescope 14 comprises a tube 16 in which is mounted an objective lens system 17 (Fig. 2) for the purpose of forming an image of the target at a given focal plane in the eye piece 15. The objective lens system 17 is comprised of a pair or more of lenses 18 and 19 which are supported by means such as separate ring-like retainers 20 and 21 respectively (Fig. 2) and adjusted at assembly. Such apparatus is shown and described in the above mentioned patents and, therefore, is not elaborated upon more fully herein. The eye piece lens system 15a (Fig. 3) is mounted for longitudinal sliding movement relative to the tube 16 to correct the focal error of each individual operator.

Fixedly secured to the forward end of the carriage 6 is an apertured bracket 23 which carries adjacent its upper end a tube 24 in which are mounted two or more lens units 25 and 26 comprising a standard lens system 27, the units 25 and 26 of which are adjusted at assembly to vary the principal focus thereof. The purpose of this standard lens system 27 is to project the image of the target to a distance with respect to a lens under test, the light rays producing the image of the target passing through this lens system 27 and the lens to be tested to the image receiving plane of the instrument.

A lens positioning nose 28 is threadedly mounted in the forward end of the tube 24, and the lens system 27 and nose 28 are relatively adjusted so that the forward end of the tube 24 will lie exactly in the plane of the principal focus of the standard lens system 27.

In calibrating the instrument the knob 10 is manipulated to bring the image of the target 9 clearly in focus in the viewing device 14. Then a lens 29 to be tested is placed against the end of the nose 28 and the knob 10 manipulated until a clear image of the target is seen in the eye piece, the reading of the scale (not shown) associated with the knob 10 indicating the focal power of the lens.

Suitable means such as a gooseneck bracket 30, having an aperture 31 through which the rays may pass, is adapted to bear against the outer side of the lens 29 being tested to hold the said lens on the outer end of the nose 28. The lower end of the bracket 30 is slidable in a tubular guide 32 carried by a support 33 on the frame 3 and is urged by means of a spring (not shown) toward the lens 29.

Suitable arms 34 adjustably carried on the frame 3 have a horizontal platform 35 which may be used to support eyeglass lenses in the proper position when testing mounted lenses.

The foregoing relates to conventional mechanism and the use thereof to measure a lens is common knowledge. However, since it is desirable at times to precisely identify the area of a lens which is contributing the focal power or prismatic effect being measured, this is done in accordance with the present invention by providing means for focusing a surface of the lens being measured in the eye piece as well as the target. By so doing, an image of the target 9 can be seen in the eye piece and an image of a surface of the portion of the lens 29 being measured can be seen as superimposed upon the image of the target. In this way the surface of the lens 29 in the area being measured can be clearly seen for examination, centering or marking as desired.

Figure 3:
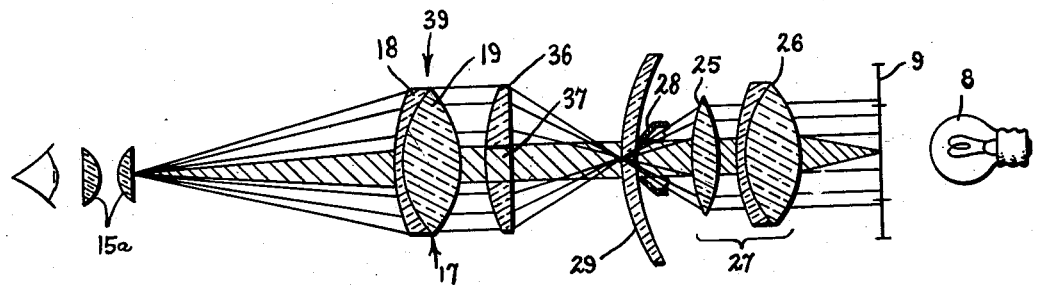
Fig. 3 is a schematic diagram of the optical system of the apparatus shown in Fig. 1.

For accomplishing this there is provided an auxiliary lens 36 which is located over the end of the telescope or image viewing device 14 opposed to the eye piece 15. The auxiliary lens 36 is provided with an aperture 37 centrally thereof, and is located so that the center of the aperture is axially aligned with the optical axis of the entire lens system. The auxiliary lens is further shaped so that light rays passing therethrough will be deflected to a central area of the lens 29 as shown in Fig. 3. Thus, the while the image of the target 9 is being projected to the eye piece 15 through the aperture 37, the auxiliary lens 36 will focus upon the central area of the lens 29 and, therefore, cause this area to be viewed in the eye piece as superimposed upon the image of the target 9.

The auxiliary lens 29 is supported in one end of a tubular member 38 which is mounted over the end of the image viewing device 14, the member 38 being adjustable longitudinally of the device by suitable means such as a stud 39 having one end rotatably supported by a clamp member 40 secured to the telescope 14 and having its other end in threaded engagement with an upright 41 carried by the tubular member 38. Thus, upon rotation of the stud 39 by means of a knurled portion 42 thereof, the tubular member 38 and auxiliary lens 36 can be adjusted toward or away from the lens 29 being measured.

Thus, this will permit either the front or rear surface of the lens 29 to be brought into focus for viewing in the eye piece 15.

It is to be understood, however, that any other conventional means may be employed for adjustably supporting the auxiliary lens 36 in desired position; also that side illumination of the lens being measured may be provided such as in the case of examining a surface thereof for pits or the like which are more clearly detected by side illumination.

This attachment has many very beneficial uses in lens manufacturing since it is very often desired to inspect a surface of a lens while the lens is being measured and to identify a specific area of the lens. For example, a lens 29 may be laid out on a protractor and a specific area to be measured identified by a dot or other mark. Then, upon inserting the lens in a device of the character described, the dot can be centered in the eye piece to insure that the area being measured is actually the area originally intended to be measured. This is extremely helpful especially in the case of bifocal segments or strong lenses such as cataract lenses. Another example is in the case of a lens which may be inserted in the device and measured. Then conventional means (not shown) can be employed for dotting the lens while still held in the device, the dot indicating the center of the area which was measured. If the lens is then removed and subsequently replaced, the dot will insure that the lens is again located so that the area originally measured is again in position for measurement.

It may also be desirable to control the amount of light directed to the eye piece from the surface of the lens 29 with respect to the amount of light transmitted from the target 9. This can be done, if desired, by mounting a conventional diaphragm 43 over the outer end of the tubular member 38 adjacent the auxiliary lens 36.

Although the foregoing description has reference particularly to a lens measuring instrument commonly known as a "lensometer," it is to be understood that other similar and conventional lens testing instruments, such as telescopes, and instruments used in the optical industry for testing sun glasses and safety goggles, can be provided with the auxiliary lens attachment if desired.

From the foregoing it will be seen that efficient and economical means have been provided for accomplishing all of the objects and advantages of the invention. While the novel features of the invention have been described and are pointed out in the annexed claims, it will be understood that many changes may be made in the details of construction and method described without departing from the spirit of the invention. I, therefore, do not wish to be limited to the exact details and method described as the preferred only are set forth by way of illustrations.

I claim:

1. In a lens testing device, the combination of a test lens holder, a target, image receiving means, a first lens means positioned to focus an image of the target to the image-receiving means through the test lens when held in the holder, and a centrally apertured lens disposed between said holder and the image-receiving means for simultaneous focusing an image of a surface of the test lens to said image-receiving means, said apertured lens being characterized in that it obtains said focusing of an image of a surface of the test lens to the image-receiving means while simultaneously allowing light rays from the first lens means to pass through the central aperture thereof to permit focusing of an image of the target through the test lens to said image-receiving means in superimposed relation with said image of the surface of the test lens.

2. A lens testing device of the character described comprising a target, a holder for supporting the lens under test in spaced relation thereto, image receiving means on the opposed side of the lens holder, lens means disposed between said image receiving means and target for projecting an image of the target through the lens under test, when positioned in the holder, to the image receiving means, and lens means located between the lens holder and image receiving means in the path of the projection of said target image, said latter lens means having a first portion adapted to project an image of the surface of the lens under test to the image receiving means and a further portion adapted to pass an uninterrupted beam for projection of the image of the target to the image receiving means by said first mentioned lens means whereby both the image of the target and of the surface of the lens under test may be projected simultaneously to the image receiving means and viewed by an observer.

3. In a lens testing device of the character described, the combination of an illuminated target, a holder for supporting a lens under test at spaced relation thereto and through which a beam of light emanating from said target is projected, image receiving means on the opposed side of said lens holder for receiving said projected image, lens means disposed between said target and image receiving means and having its optical characteristics so controlled as to produce an image of said target at said image receiving means through the lens under test, when positioned in the holder, and lens means positioned between the holder and image receiving means in the path of the projection of said target image, said last mentioned lens means having a portion with its optical characteristics so controlled as to function cooperatively with said first-mentioned lens means to project an image of the surface of the lens under test and focus said image at said image receiving means and a further portion adapted to pass an unaffected projection of said target image whereby said target image and image of said surface of the lens under test may be simultaneously viewed at said image receiving means.

4. A lens testing device of the character described comprising a target, a holder for supporting the lens under test in spaced relation thereto, image receiving means on the opposed side of the lens holder, lens means disposed between said image receiving means and target for projecting an image of the target through the lens under test, when positioned in the holder, to the image receiving means, and lens means located between the lens holder and image receiving means in the path of projection of said target image, said latter lens means having a first portion adapted for projecting an image of the surface of the lens under test to the image receiving means and a second portion adapted to pass uninterrupted simultaneous projection of the image of the target to the image receiving means by the first-mentioned lens means and means for axially adjusting the location of said latter lens means toward and away from the lens holder to permit projection of an image of either surface of the lens under test to the image receiving means.

5. A lens testing device of the character described comprising a target, a holder for supporting the lens under test in spaced relation thereto, image receiving means on the opposed side of the lens holder, lens means disposed between said image receiving means and target for projecting an image of the target through the lens under test, when positioned in the holder, to the image receiving means, and lens means located between the lens holder and image receiving means and in the path of the projection of the image of the target to the image means by the first-mentioned lens means, said latter lens means having a first portion adapted for projecting an image of the surface of the lens under test to the image receiving means and a second portion adapted to pass an uninterrupted simultaneous projection of the image of the target to the image receiving means by the first-mentioned lens means, and an adjustable diaphragm between said latter lens means and the holder for controlling the brightness of the image of the lens surface projected to the image-receiving means.

6. A device for use in a lens testing instrument of the character embodying a target, a holder for supporting the lens under test in spaced relation thereto, image receiving means on the opposed side of the lens holder, and lens means disposed between said image receiving means and target for projecting an image of the target through the lens under test, when positioned in the holder, to the image receiving means, said device comprising a support having means for attachment to said instrument at a location between the lens holder and image receiving means and carrying lens means having a first portion adapted for projecting an image of the surface of the lens under test to the image receiving means and a second portion adapted to pass an uninterrupted projection of the image of the target to the image receiving means by the first mentioned lens means when said lens means is located in said path of the projection of the image of the target to the image receiving means by the former lens means whereby the images of the test target and the surface of the lens under test may be simultaneously projected to the image receiving means.

7. A device for use in a lens testing instrument of the character embodying a target, a holder for supporting the lens under test in spaced relation thereto, image receiving means on the opposed side of the lens holder, and lens means disposed between said lens holder and target for projecting an image of the target through the lens under test, when positioned in the holder, to the image receiving means, said device comprising a support having means for attachment to said instrument at a location between the lens holder and image receiving means and carrying lens means in the path of the projection of the image of the target to the image means by the former lens means, said lens means carried by the support having one portion adapted to pass an uninterrupted simultaneous projection of the image of the target to the image receiving means by the first mentioned lens means and a second portion adapted for projecting an image of the surface of the lens under test to the image receiving means and said lens means being adjustably mounted to permit projection of either surface of the lens under test.

8. A device for use in a lens testing instrument of the character described embodying a target, a holder for supporting the lens under test in spaced relation thereto, image receiving means on the opposed side of the lens holder, and lens means disposed between said lens holder and target for projecting an image of the target through the lens under test, when positioned in the holder, to the image receiving means, said device comprising a support having means for attachment to said instrument at a location between the lens holder and image receiving means and carrying lens means for projecting an image of the surface of the lens under test to the image receiving means when located in the path of the projection of the image of the target to the image means by the former lens means, said lens means carried by the support being adjustable to permit projection of either surface of the lens under test and having a centrally disposed aperture permitting an uninterrupted simultaneous projection of the image of the target to the image receiving means by the first mentioned lens means when located in said path.

9. In a lens testing instrument of the character described embodying a target, a holder for supporting the lens under test in spaced relation thereto, image receiving means on the opposed side of the lens holder, and lens means disposed between said lens holder and target for projecting an image of the target through the lens under test, when positioned in the holder, to the image receiving means, a lens support connected to said instrument at a location between the lens holder and image receiving means and carrying lens means located in the path of the projection of the image of the target to the image means by the first mentioned lens means for projecting an image of the surface of the lens under test to the image receiving means, said lens means having a centrally disposed aperture permitting an uninterrupted simultaneous projection of the image of the target to the image receiving means by the first mentioned lens means, said latter lens means being axially adjustable to permit an image of either surface of the lens under test to be projected to the image receiving means when desired, and an adjustable diaphragm carried by said lens support between the latter lens means and the lens holder for the lens under test for controlling the density of the image of the lens surface projected to the image receiving means.

JOHN K. DAVIS.

REFERENCES CITED

The following references are of record in the file of this patent:

UNITED STATES PATENTS

| Number | Name | Date |
| --- | --- | --- |
| 1,164,795 | Emerson | Dec. 21, 1915 |
| 1,170,579 | Troppman | Feb. 8, 1916 |
| 1,383,678 | Tillyer et al. | July 5, 1921 |
| 1,542,112 | Tillyer | June 16, 1925 |
| 2,114,282 | Ames et al. | Apr. 19, 1938 |
| 2,498,273 | Hillman | Feb. 21, 1950 |
| 2,504,383 | Bowers et al. | Apr. 18, 1950 |

FOREIGN PATENTS

| Number | Country | Date |
| --- | --- | --- |
| 27,572 | Great Britain | of 1903 |
| 350,651 | Germany | Mar. 21, 1922 |